(12) United States Patent
Li et al.

(10) Patent No.: US 7,349,504 B2
(45) Date of Patent: Mar. 25, 2008

(54) METHOD AND SYSTEM FOR MITIGATING INTERFERENCE IN COMMUNICATION SYSTEM

(75) Inventors: Hang Li, Allen, TX (US); Guanghan Xu, Garland, TX (US)

(73) Assignee: Navini Networks, Inc., Richardson, TX (US)

( * ) Notice: Subject to any disclaimer, the term of this patent is extended or adjusted under 35 U.S.C. 154(b) by 12 days.

(21) Appl. No.: 11/083,478

(22) Filed: Mar. 18, 2005

(65) Prior Publication Data

US 2006/0210001 A1  Sep. 21, 2006

(51) Int. Cl.
  *H03D 1/04* (2006.01)
(52) U.S. Cl. ........................ 375/346; 375/140
(58) Field of Classification Search ................ 375/130, 375/137, 140, 141, 146–148, 144, 227, 261, 375/297, 346, 278, 284, 296, 348; 370/210, 370/230, 320, 332, 335, 342, 441, 527, 216; 455/59, 63.1, 67.13, 69, 101, 451, 522, 560, 455/562.1
See application file for complete search history.

(56) References Cited

U.S. PATENT DOCUMENTS

| | | | |
|---|---|---|---|
| 5,267,262 A | | 11/1993 | Wheatley, III |
| 5,559,790 A | | 9/1996 | Yano et al. |
| 6,377,606 B1 * | 4/2002 | Toskala et al. ............. 375/130 |
| 6,662,019 B2 * | 12/2003 | Kamel et al. ................ 455/522 |
| 6,735,247 B2 * | 5/2004 | Lundby ....................... 375/227 |
| 6,856,644 B1 * | 2/2005 | Wang et al. ................. 375/130 |
| 2002/0193146 A1 * | 12/2002 | Wallace et al. ............. 455/562 |
| 2003/0064729 A1 * | 4/2003 | Yamashita ................... 455/451 |
| 2003/0190937 A1 * | 10/2003 | Karmi et al. ................ 455/574 |
| 2004/0176033 A1 | 9/2004 | Tamaki et al. |
| 2004/0179499 A1 | 9/2004 | Sindhushayana et al. |
| 2005/0014470 A1 * | 1/2005 | Malladi ................... 455/67.13 |

* cited by examiner

*Primary Examiner*—Chieh M. Fan
*Assistant Examiner*—Jaison Joseph
(74) *Attorney, Agent, or Firm*—Kirkpatrick & Lockhart Preston Gates Ellis LLP

(57) ABSTRACT

A method and system for mitigating interference in a communication system, comprising at least one base station and at least one terminal, are disclosed. The base stations and terminals communicate through a channel existing between them, and the channels include at least a first signal channel and a second signal channel. The method includes determination of channel, noise and self-interference characteristic, computation of a rate limit of the channels, computation of the rate assignment of the channels, and assignment of the computed rate assignments to the channels. In another aspect of the present invention, the method includes determination of channel characteristics; computation of a power control margin, self-interference characteristics, power control command; and assignment of the computed power control command to each communicating terminal and base station. The above power and rate control methods may operate jointly to mitigate both intra-cell and inter-cell interference in wireless communication systems.

18 Claims, 10 Drawing Sheets

METHOD AND SYSTEM FOR MITIGATING INTERFERENCE IN COMMUNICATION SYSTEM

BACKGROUND

The present invention relates to the field of communication systems. In particular, the present invention relates to a method and system for mitigating interference in a communication system.

In communication systems, a large amount of information is exchanged between various hosts. A wireless communication system is one such system. In conventional wireless communication systems, multiple base stations provide a coverage area, with each base station being an access point covering one cell, i.e., a smaller region in the coverage area.

Multiple access techniques are utilized to enable simultaneous communication between a base station and multiple terminals. The terminals and base stations, of a portion of or all the cells, communicate by using the same Radio Frequency (RF), in order to increase spectrum efficiency. This is conventionally known as the frequency re-use mechanism.

When a large number of terminals communicate with multiple Base Transceiver Stations (BTS) at the same time, many different kinds of signal degradations take place. Apart from the omnipresent thermal noise, the degradations may be caused by either interference or channel-gain fluctuations. The latter is conventionally known as channel fading.

In frequency re-use, a signal transmission in one cell is degraded by signals transmitting in neighboring cells, for uplink as well as downlink. This is known as inter-cell interference, which, along with thermal noise, is referred to as Other Interference (OI).

Mutual interference is generated at the receiver for both uplink and downlink communication due to channel degradations. Examples of channel degradations include non-orthogonal codes being used by different terminals; multipath delay dispersion; imperfect timing, frequency synchronization, radio frequency circuitry and channel estimation. If multiple terminals communicate with a base station, each with a single channel, the mutual interference is called Multiple Access Interference (MAI). If a single terminal communicates with the base station, using multiple codes, the mutual interference is called Self-interference (SI). Both MAI and SI exist in wireless communication systems. These interferences are also referred to as intra-cell interference.

An important characteristic of intra-cell interference is that the power of the interference is a monotonically increasing function of the transmission power of the desired signal. Hence, at some point, increasing the signal transmission power may not improve the quality of the signal. Instead, increasing the signal transmission power may increase inter-cell interference in other cells.

Conventionally, a fast power-control mechanism is required to compensate for channel fading, based on the fast feedback of channel quality measurement. However, this consumes more bandwidth and may achieve high frequency power control only in Frequency Division Duplex (FDD) systems. For Time Division Duplex (TDD) systems, power control frequency is limited by the inverse of frame duration, and more efficient power control is needed.

Transmission rate and power control systems have been designed to overcome such limitations. One such power control system is described in U.S. Pat. No. 5,267,262, titled 'Transmitter Power Control System', assigned to Qualcomm Incorporated. In this patent, a combination of open- and closed-loop power control methods is described, to keep the power received by a receiver virtually constant. The receiver measures the signal power received and issues commands to a transmitter to increase or decrease it. However, the control is purely signal power-based, and is not distinguishable among different interferences and thermal noise.

Another power control method is described in U.S. Pat. No. 5,559,790, titled 'Spread Spectrum Communication System and Transmission Power Control Method Therefor', assigned to Hitachi Ltd., which monitors channel quality by using a pilot channel and an orthogonal noise observation code channel. However, this method may not accurately estimate either the signal power or the noise power, because of self-interference and/or multiple access interference. Further, the method described does not compute the self-interference.

Yet another power control method is described in US Patent application number 20040176033A1, titled 'Wireless Communication System and Transmit Power and Data Rate Control Method Therefor', assigned to Mattingly, Stanger & Malur, P. C. This patent application discloses a channel-coding rate for a multi-carrier modulation (OFDMA) system. The power control is purely power-based, and interference is not accurately tracked. The data rate control is utilized to adjust the channel-coding rate.

A data control method to maintain a target Packet Error Rate (PER) is described in US Patent Application number 20040179499A1, titled 'Method and Apparatus for a Rate Control in a High Data Rate Communication System', assigned to Qualcomm Incorporated. In this patent application, an open-loop algorithm measures the Signal-to-all-Interference-plus-thermal-Noise Ratio (SINR) at regular intervals, and the close-loop algorithm measures the PER. The rate control scheme uses aggregate quality metric SINR or PER. However, no accurate channel information is explored and utilized.

When multiple terminals are communicating with a common base station, each terminal experiences different levels of inter-cell, intra-cell interference and channel gain fading. This phenomenon is called multi-user diversity. In such a scenario, the downlink medium is shared to maximize the throughput. The base station performs data rate control by scheduling transmission of only one terminal at any given slot when channel conditions are good for the terminal. However, this scheme introduces packet latency due to mismatch between traffic arrival and channel condition.

Therefore, to jointly address the aforementioned interferences, fading and multi-user diversity problems, and to provide a robust communication system, an efficient data rate and power assignment method is desirable. The method should incorporate accurate physical channel information regarding different types of interferences, fading, and the available transmission power.

SUMMARY

An object of the present invention is to provide link robustness for each terminal in a communication system.

A further object of the present invention is to maximize the throughput of the communication system.

Yet another object of the present invention is to provide a scheme for controlling the transmission rate and power assignment simultaneously, as well as independent of each other, to mitigate interference in a communication system.

The present invention provides a method and system for computing the rate and power assignment in such a way, so as to improve the system throughput and provide link robustness to each terminal in the communication system. In an embodiment of the present invention, a suitable rate and power assignment strategy is described, which identifies the nature of the link quality, i.e., the link quality is power limited, inter-cell interference limited, or self-interference limited, to compute the power and rate assignments.

The present invention mitigates interference in a communication system. The channel characteristics of the channels utilized for communication are determined, followed by the computation of a rate limit of the channels. Subsequently, computation of a rate assignment of the channels is carried out, and the computed rate assignment is then assigned to the communication channels. In another embodiment of the present invention, computation of a power control margin is carried out after the channel characteristics are determined. This is followed by the computation of interference characteristics and of a power control command. The computed power control command is then assigned to each communicating terminal and base station, for mitigating interference.

The present invention assigns the data rate and transmission power for each terminal, in order to maintain a robust link for each terminal in multi-path fading channels, while using minimum transmission power. With the method disclosed in the present invention, minimum inter-cell and intra-cell interference may be generated and a higher system capacity achieved.

BRIEF DESCRIPTION OF THE DRAWINGS

The various embodiments of the invention will hereinafter be described in conjunction with the appended drawings provided to illustrate and not to limit the invention, wherein like designations denote like elements, and in which.

DESCRIPTION OF THE PREFERRED EMBODIMENTS

For purposes of clarity, the following terms used herein are defined below:

Inter-cell interference: In frequency re-use, a signal transmission in one cell is degraded by signals transmitting in neighboring cells, for uplink as well as downlink. This is known as inter-cell interference.

Other Interference (OI): This refers to a combination of inter-cell interference and thermal noise.

Mutual Interference (MI): MI is generated at the receiver for both uplink and downlink communication due to channel degradations. Examples of channel degradations include non-orthogonal codes being used by different terminals; multi-path delay dispersion; imperfect timing, frequency synchronization, radio frequency circuitry and channel estimation.

Multiple Access Interference (MAI): If multiple terminals communicate with a base station, each with a single channel, the mutual interference is called MAI.

Self-interference (SI): If a single terminal communicates with the base station, using multiple codes, the mutual interference is called Self-interference (SI). Both MAI and SI exist in wireless communication systems. These interferences are also referred to as intra-cell interference. SNR: This refers to Signal to Noise ratio. SNR can be an indicator of signal quality if the signal is polluted only by OI.

SINR: This refers to Signal-to-all-Interference-plus-thermal-Noise Ratio (SINR). The SINR can be the total signal quality, i.e., it includes total noise such as SI, MAI, OI and thermal noise.

The present invention provides a method and system for mitigating interference in a communication system. The present invention is used to mitigate various types of interferences, fading and multi-user diversity problems. It also achieves a robust communication system by implementing an efficient rate and power assignment method that incorporates accurate physical channel information.

Figure 1:
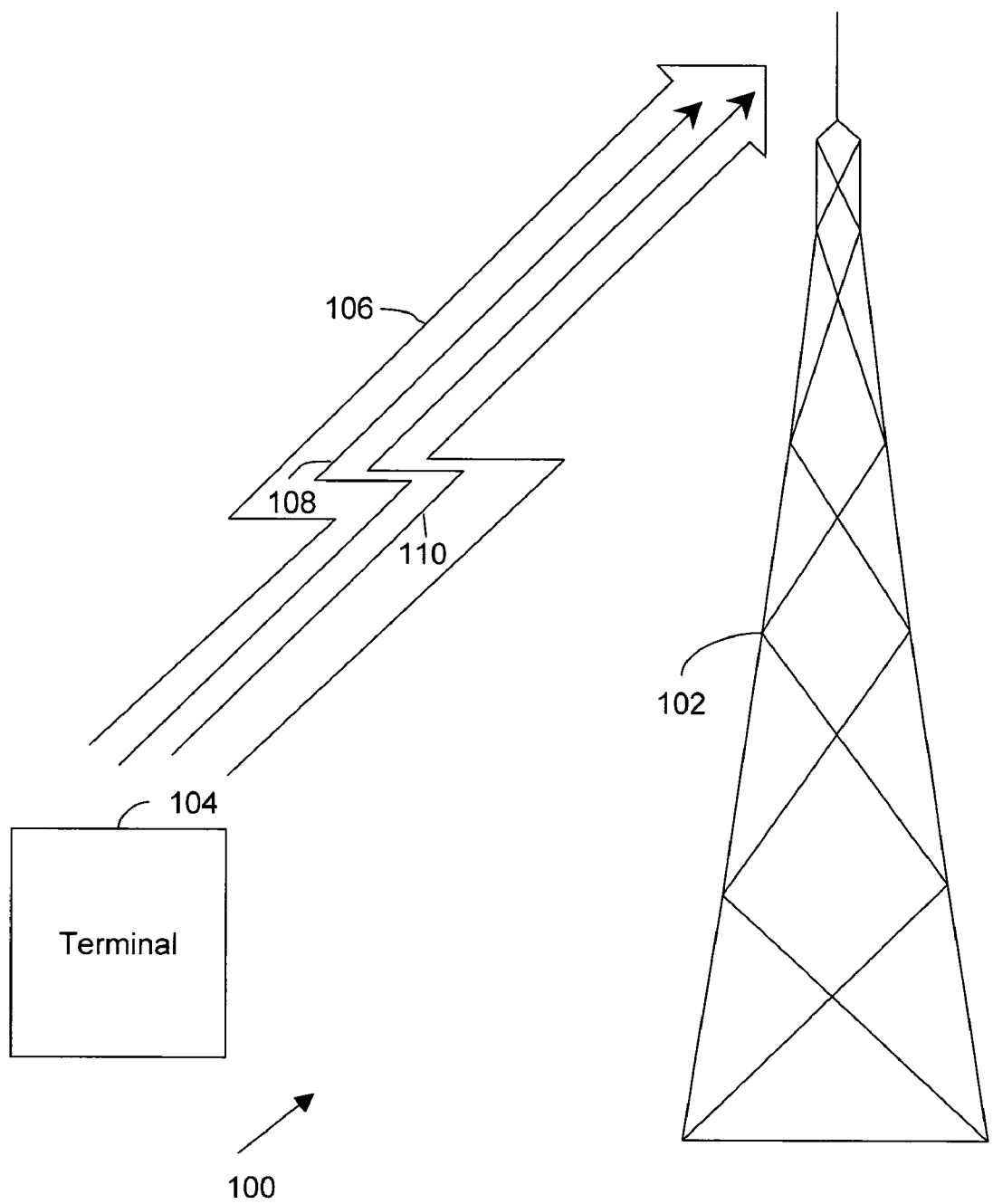
FIG. 1 is a block diagram illustrating the communication between a terminal and a base station.

FIG. 1 is a block diagram illustrating the communication between a terminal and a base station of a communication system 100. As shown in FIG. 1, a base station 102 communicates with a terminal 104 over a wireless medium. The communication between base station 102 and terminal 104 is enabled through a channel 106. Channel 106 comprises a first signal channel 108 and a second signal channel 110. In an embodiment of the present invention, channel 106 belongs to the uplink, as shown in FIG. 1. In another embodiment of the present invention, channel 106 belongs to the downlink. Base station 102 and terminal 104 are used in a multi-cell environment comprising at least one base station and one terminal. A representative example of a two-cell environment is described in detail in conjunction with FIG. 2.

During the communication between base station 102 and terminal 104, a first signal is communicated through first signal channel 108, and a second signal is communicated through second signal channel 110. In an embodiment of the present invention, the first signal is either a training signal or a pilot signal that includes known symbols, while the second signal is a traffic signal comprising information-bearing symbols.

The transmission and reception of data in communication system 100 is carried out through channels 108 and 110. Every reception through channels 108 and 110 includes the first signal, the second signal, and noise, which include an inter-cell interference and thermal noise. The disclosed method for rate and power control depends on the noise characteristic in order to distinguish between intra-cell and inter-cell interference. The noise characteristics may be obtained by taking data directly from inactive slots, which are utilized for communication. The noise characteristics may also be obtained by subtracting an estimated intra-cell signal from the traffic signal after symbol decision or decoding has been performed in the second channel. Each inactive slot is configured by base station 102 in such a way that no communication involving base station 102 occurs in the slot while communication involving other base stations are present in the slot. The inter-cell interference, along with the thermal noise characteristic, is the power computed after either a beam-forming or nulling operation is applied. The inter-cell interference and intra-cell interference is described in conjunction with FIG. 2.

Figure 2:
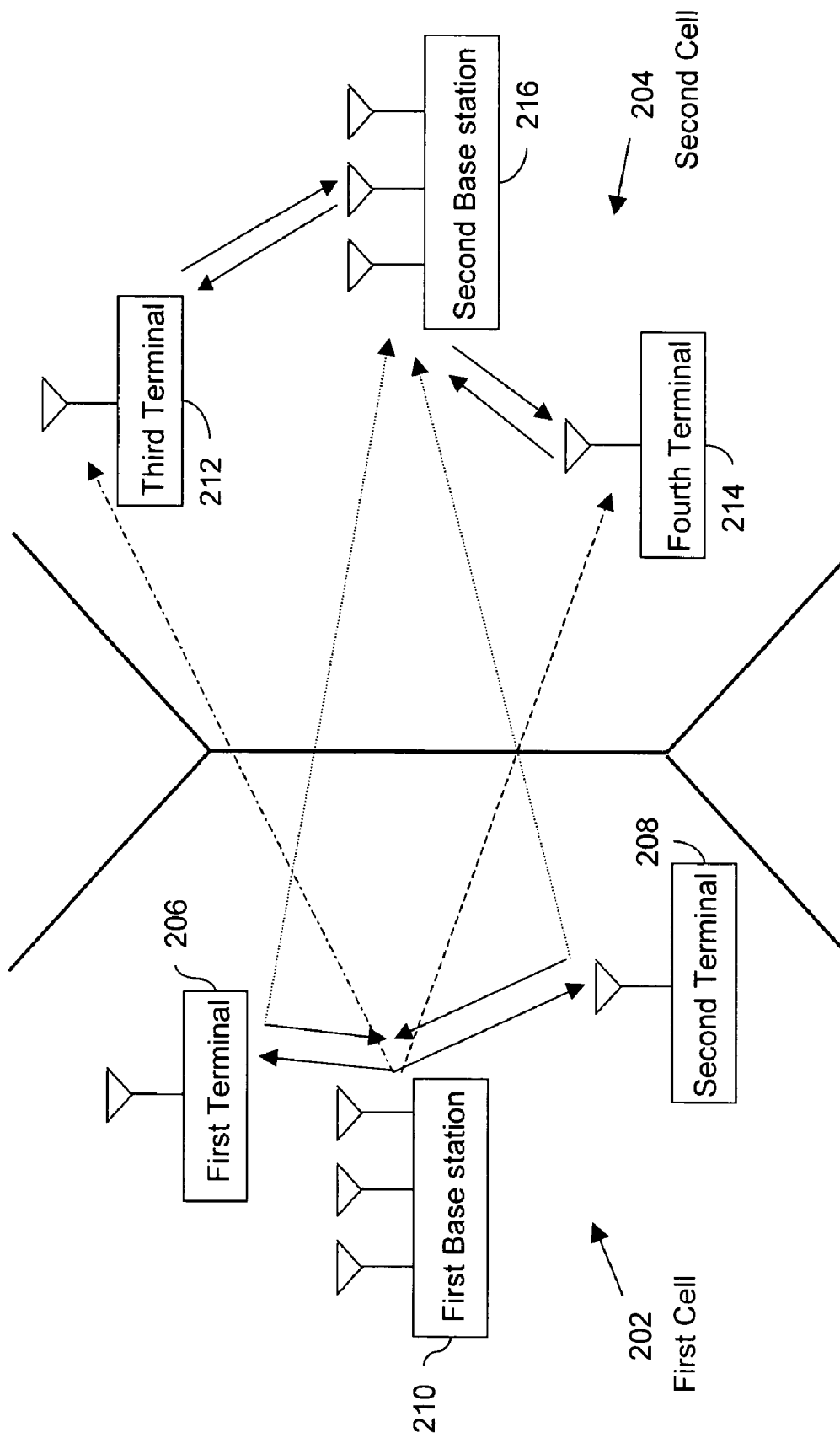
FIG. 2 is a block diagram illustrating communication between various base stations and terminals.

FIG. 2 is a block diagram illustrating the communication between various base stations and terminals. In FIG. 2, a communication system 200 includes a first cell 202 and a second cell 204. First cell 202 includes a first terminal 206, a second terminal 208, and a first base station 210. First terminal 206, second terminal 208 and first base station 210 operate in the same frequency band. Similarly, second cell 204 includes a third terminal 212, a fourth terminal 214, and a second base station 216. Third terminal 212, fourth terminal 214 and second base station 216 also operate in the same frequency band as first cell 202.

All the terminals communicate with their corresponding base stations simultaneously. For example, first terminal 206 and second terminal 208 communicate with first base station 210, while third terminal 212 and fourth terminal 214 communicate with second base station 216. This communication is duplex, using either frequency division (FDD) or time division (TDD). As a result, the receiving ends, i.e., the base stations and the terminals, receive the desired signal as well as intra-cell and inter-cell interference during uplink or downlink communication. For example, third terminal 212 receives a downlink signal from second base station 216. This downlink signal includes an undesired signal (intra-cell interfering signal), that is intended for fourth terminal 214, as well as the desired signal intended for third terminal 212. Third terminal 212 also receives an undesired signal (inter-cell interfering signal) from first base station 210, intended for first terminal 206 and second terminal 208. All the desired signals, along with the various interfering signals, are received at third terminal 212. The situation is similar for first terminal 206, second terminal 208 and fourth terminal 214. Similarly, in the uplink, second base station 216 receives interfering signals from first terminal 206 and second terminal 208 as well as the desired signals from third terminal 212 and fourth terminal 214. A system that overcomes the interferences described above, and enhances data reception quality is described in detail in conjunction with FIG. 3.

Figure 3:
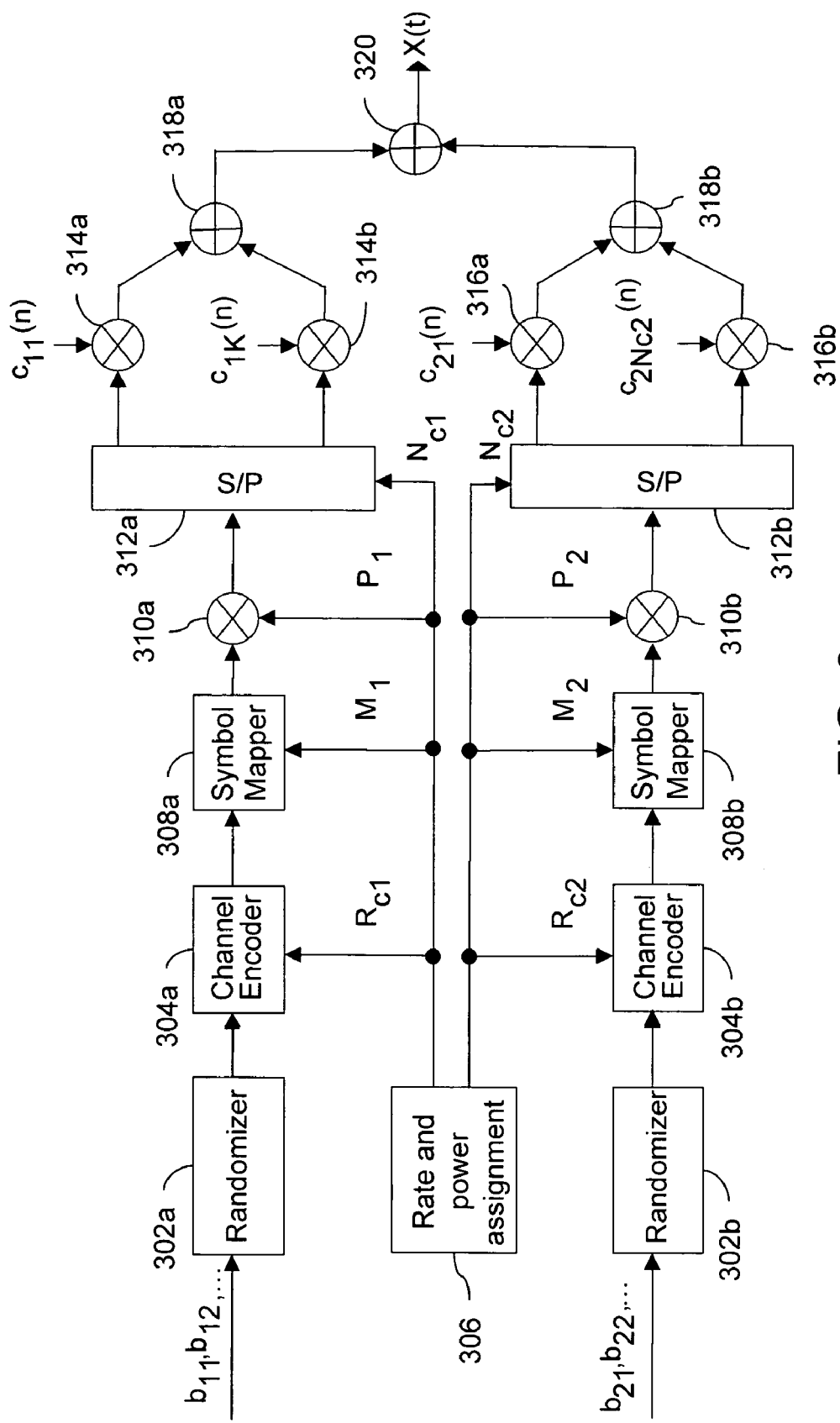
FIG. 3 is a block diagram illustrating a rate and power assignment device for parallel data transmission.

FIG. 3 is a block diagram illustrating a rate and power assignment device for parallel data transmission. In an embodiment of the present invention, parallel data transmission may be employed for the transmission and reception of uplink as well as downlink. Parallel data transmission may be enabled by various techniques, for example, Code Division Multiple access (CDMA) and Multi-carrier CDMA (MC-CDMA). In a generic setup for a terminal, the rate and power assignment have four parameters, i.e., the channel code rate, the modulation order, the number of codes, and the transmission power.

FIG. 3 depicts the processing of information-bearing symbols transmitted from two terminals. The environment includes a power and rate assignment block 306 that receives the power and rate assignments to be assigned as the input for the processing of the information-bearing symbols. The power and rate assignments are on the basis of physical channel characteristics such as the link power quality, inter-cell interference and self-interference. This assignment of power and rate enable robust communication.

As shown in FIG. 3, the symbols [b11, b12, . . . ] are transmitted from, for example, terminal 206, while symbols [b21, b22, . . . ] are transmitted from second terminal 208. Each of the symbols is randomized for secured transmission by using randomizers 302a and 302b. Randomizers 302a and 302b use a pseudo random generation algorithm to perform a random operation on the received symbols. Subsequently, the randomized symbols are converted into channel-encoded bits by using channel encoders 304a and 304b. The encoded bits are then mapped by symbol mappers 308a and 308b into symbols of assigned modulation, for example, 8-Phase Shift Keying (PSK), 4-Quadrature Amplitude Modulation (QAM), 16-QAM or 64-QAM. The amplitude of each symbol is then scaled according to assigned power Pi, i.e., P1 and P2 for the respective symbols. The assigned power is provided by power and rate assignment block 306. Serial-to-parallel (S/P) conversion units 312a and 312b subsequently multiply the power-assigned symbols by one of the assigned codes 314 (C11 to C1k) and 316 (C21 to C2k) for the respective terminals in a predetermined order. The symbols obtained after multiplication with the assigned codes are then added through adder 320, to generate a traffic signal x(t). The composite data rate corresponding to the above operations is given by:

$$R_i = R_{ci} \cdot \log_2(M_i) \cdot N_{ci}/N \cdot R \qquad (1)$$

wherein N is the length of each assigned code and R is the code chip rate. The rates are assigned by power and rate assignment block 306.

In the case of parallel data transmission, illustrated in FIG. 3, the traffic signal x(t) received by, for example, third terminal 212 or base station 216 is provided by the equation (2):

$$x(t) = \sum_{i=1}^{2} \underbrace{H_{2i} P_{2i}^{1/2} s_{2i}(t)}_{\text{intra-cell-signals}} + \sum_{i=1}^{2} \underbrace{H_{1i}(t) P_{1i}^{1/2} s_{1i}(t)}_{\text{inter-cell-interference}} + w(t) \qquad (2)$$

wherein $H_{2i}$ denotes the effective channels between terminals 212, 214, and base station 216, and $H_{1i}$ denotes the effective channels between terminals 206, 208, and base station 216. $P_{1i}$ and $P_{2i}$ are the transmission signal power for the terminals in cell 202 and second cell 204, respectively, and w(t) is the thermal noise.

As shown in equation (2), the desired signal $s_{21}$ (t) is received with intra-cell signal $s_{22}(t)$, inter-cell signal $s_{11}(t)$ and $s_{12}(t)$, and thermal noise w(t). In order to detect $S_{21}$ (t), an intra-cell interference suppression algorithm, such as joint detection or equalization, can be applied to x(t). In most cases, neither $H_{21}$ nor $H_{22}$ has orthogonal columns.

In addition, the range spaces of $H_{21}$ and $H_{22}$ may not be necessarily orthogonal. The non-orthogonality can be caused by any channel effect due to multi-path delay dispersion, imperfect timing or frequency synchronization, imperfect RF circuitry, imperfect channel estimation, etc.

Therefore, if an estimated joint detection matrix $A_{21}$ is applied to x(t), the estimated symbol is polluted by SI as well as MAI and OI. The effect is shown in equation (3), $$\hat{s}_{21}(t) = D_{21}P_{21}^{1/2}s_{21}(t) + \underbrace{B_{21}P_{21}^{1/2}s_{21}(t)}_{\text{self-interference}} + \qquad (3)$$

$$\underbrace{A_{21}H_{22}P_{22}^{1/2}s_{21}(t)}_{\text{multiple-access-interference}} + \underbrace{\sum_{i=1}^{2}A_{21}H_{1i}(t)P_{1i}^{1/2}s_{1i}(t) + A_{21}w(t)}_{\text{inter-cell-interference}}$$

where $D_{21}=\text{diag}\{A_{21}H_{21}\}$ and $B_{21}=A_{21}H_{21}-D_{21}$. Equations (2-3) are generic and valid for the uplink as well as the downlink. If multiple antennas are employed at the base station, $H_{ij}$ denotes the effective channel after beam forming or nulling is applied on the original vector channel. By simply increasing $P_{21}$, signal quality may not improve proportionally, as is evident from equation (3). This is because both the signal power and the SI/MAI power increase with $P_{21}$. In case only one terminal transmits in second cell 204, MAI becomes zero.

The present invention allows the data rate and assigned power to be controlled by using power and rate assignment block 306. In an exemplary embodiment, power and rate assignment block 306 is implemented in the form of a software module, a hardware module, and their combination thereof. In an embodiment, power and rate assignment block 306 is implemented as a part of, for example, an Application-specific Integrated Circuit (ASIC), a System on Chip (SoC), and a firmware.

It is to be noted that blocks randomizer 302, channel encoders 304a and 304b, symbol mappers 308a and 308b, multipliers 310a and 310b, S/P units 312a and 312b, and adders 318a, 318b and 320 are known in the art and should be apparent to a person skilled in the art.

Figure 8:
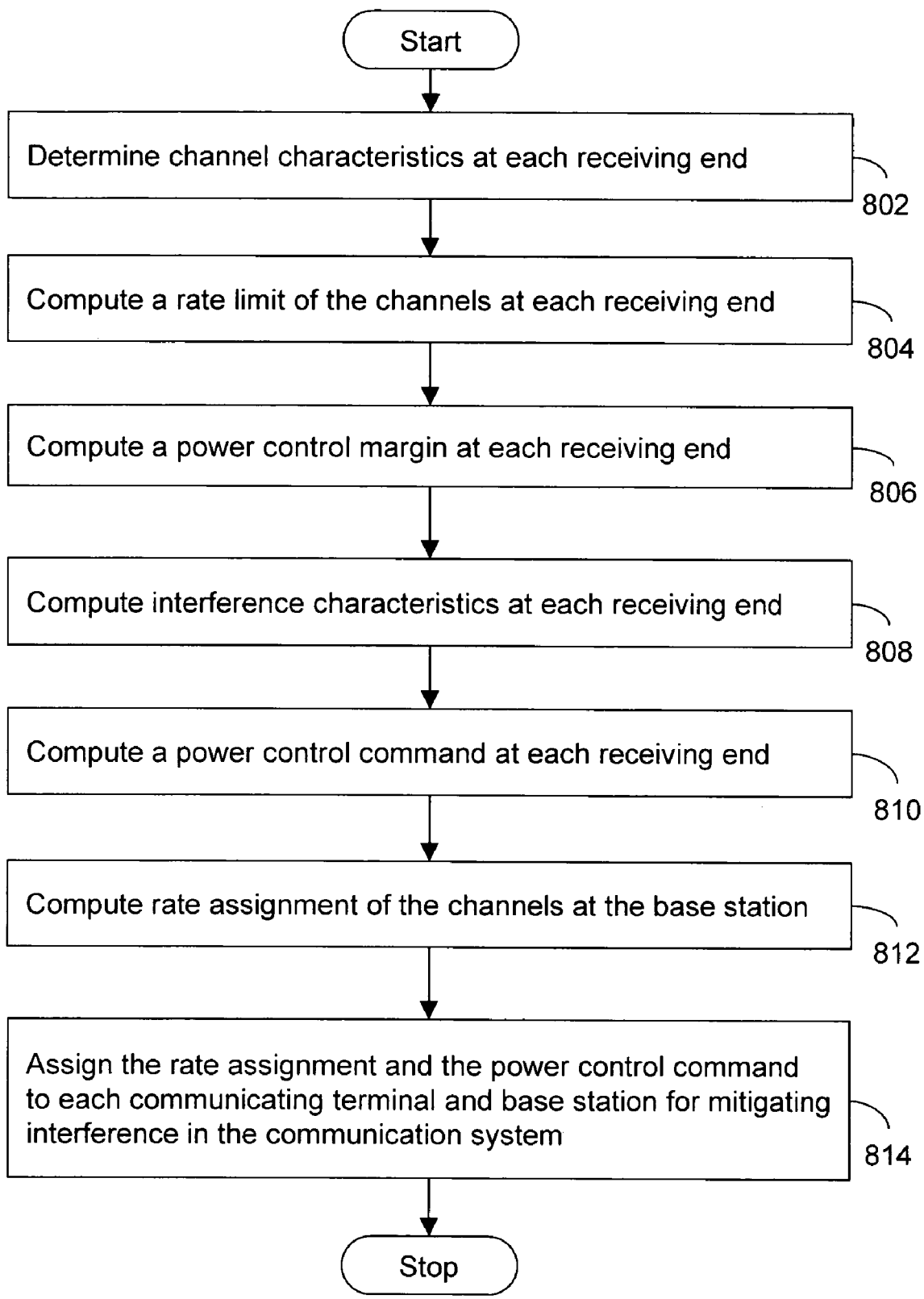
FIG. 8 is a flowchart illustrating a method for mitigating interference in a communication system, in accordance with yet another embodiment of the present invention.
Figure 9:
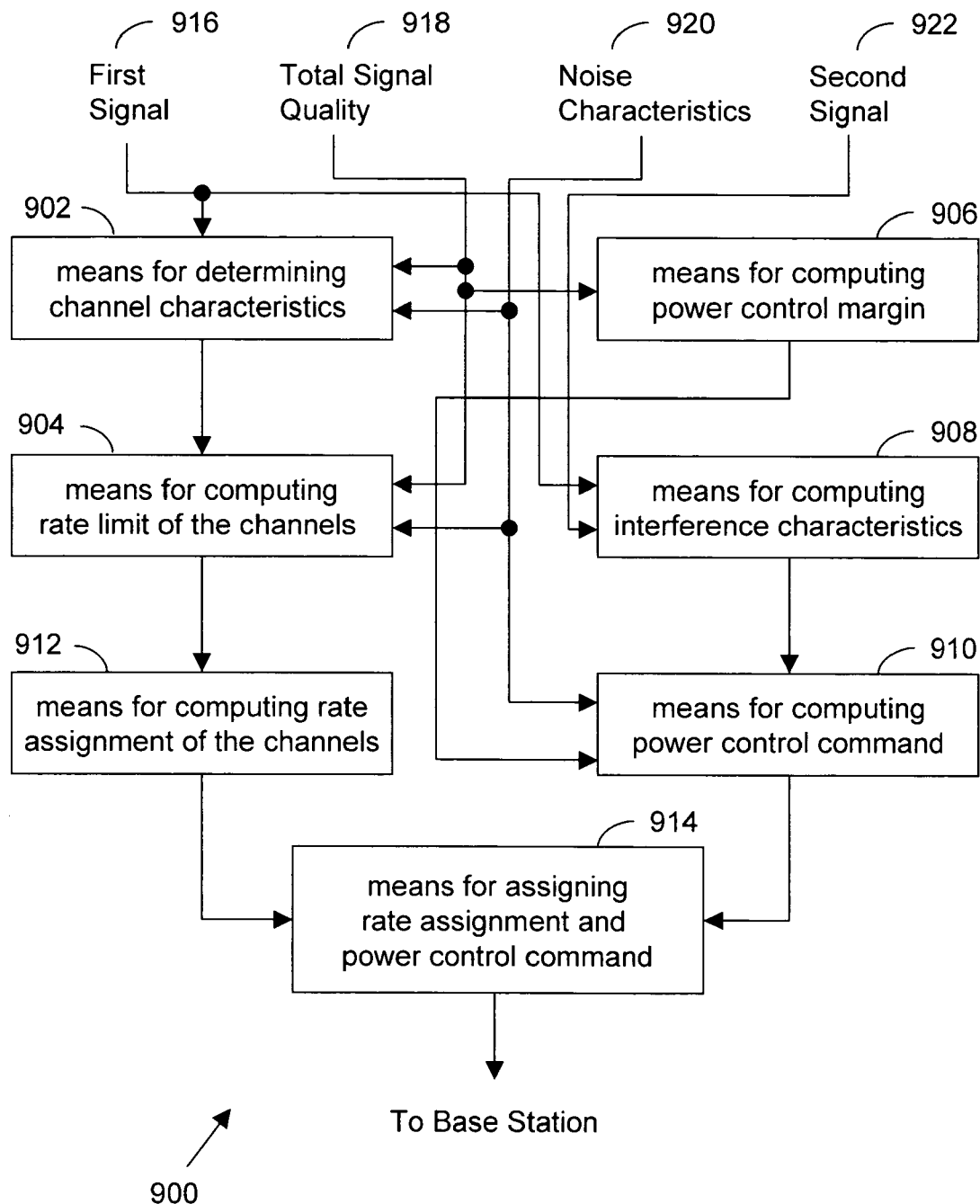
FIG. 9 is a block diagram of an apparatus used for mitigating interference in a communication system.
Figure 10:
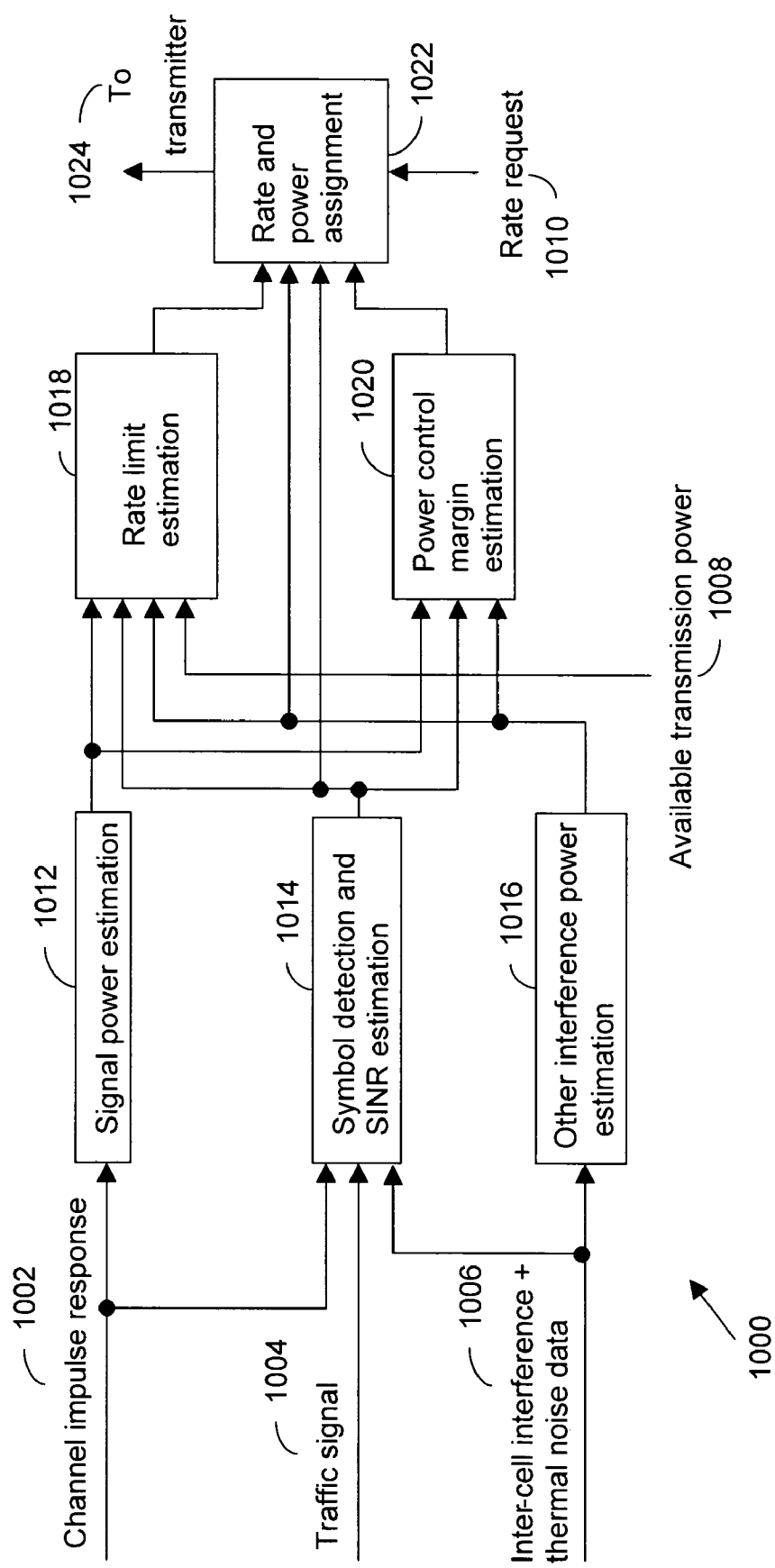
FIG. 10 is a detailed block diagram of an apparatus used for mitigating interference in a communication system, in accordance with an exemplary embodiment of the present invention.

Various embodiments of the rate and power assignment device that provides the input to power and rate assignment block 306 is described in detail, in conjunction with FIG. 9 and FIG. 10. The method employed in the rate and power assignment device, to generate the required power and rate assignment commands, is hereinafter described in detail, in conjunction with FIGS. 4, 5, 6, 7 and 8.

Figure 4:
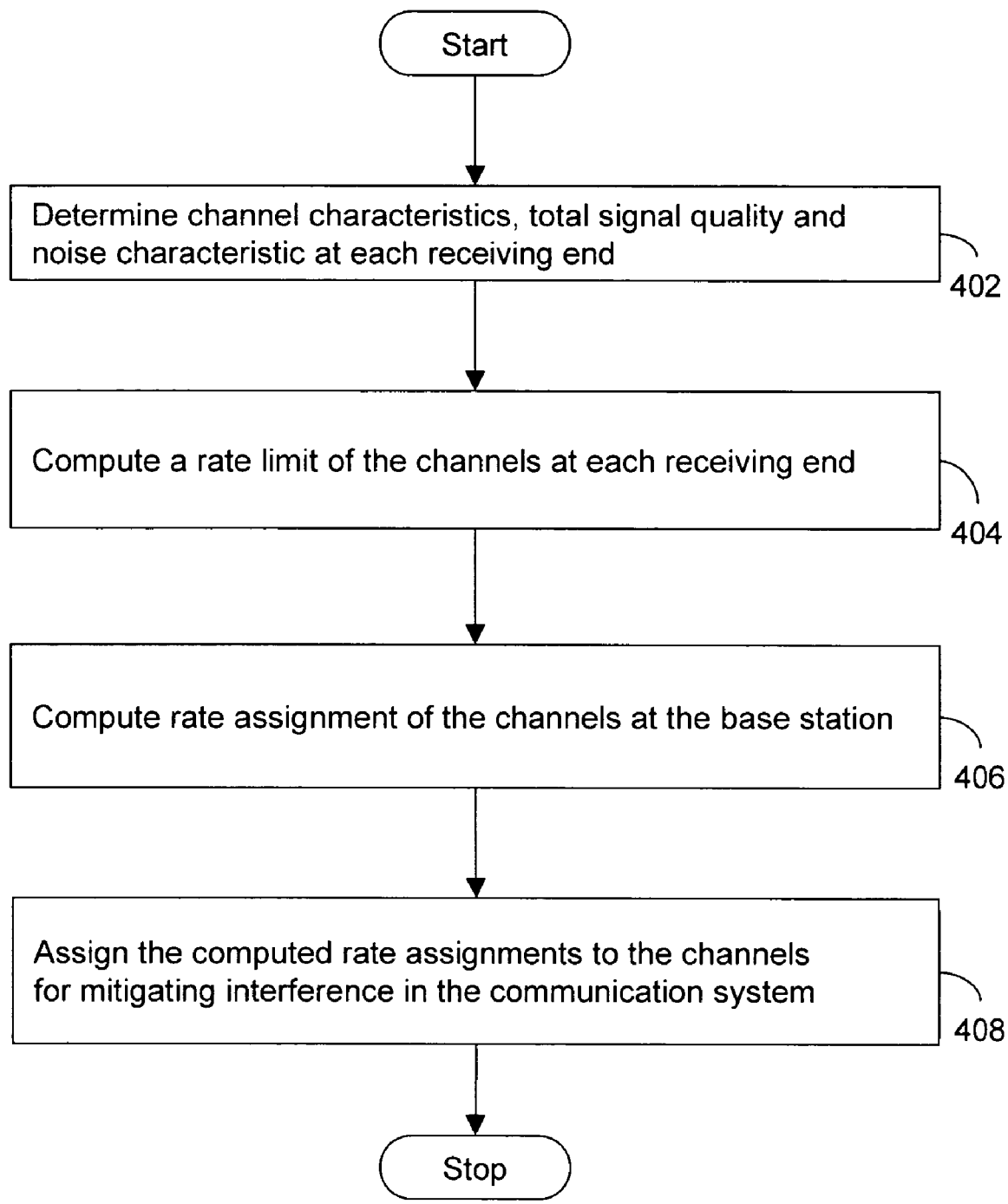
FIG. 4 is a flowchart illustrating a method for mitigating interference in a communication system, in accordance with an exemplary embodiment of the present invention.

FIG. 4 is a flowchart illustrating a method for mitigating interference in a communication system, in accordance with an exemplary embodiment of the present invention. At step 402, channel characteristics are determined at each receiving end, where the receiving end is at least one of base station 102 and terminal 104. The channel characteristics include channel impulse responses for the receive antennas of each of the receiving ends. In an embodiment, determination of the channel characteristics is the channel impulse response, and its estimation is based on the first signal. In another embodiment, the total signal quality is based on the detected symbol output of the second signal. Noise characteristics may be determined by using data from one or more inactive slots configured by the communicating base station. The inactive slots are configured in such a manner that only the communication signals involving other base stations are present in the slots. In another embodiment, noise characteristic may be estimated by subtracting the known intra-cell signal from the received signal. The known signal may be either the training signal or detected traffic signal. Accordingly, the received signal may be the received training signal or received traffic signal.

In an embodiment, SINR is chosen to be the total signal quality. Total noise includes SI, MAI, OI and thermal noise. SINR is computed for each terminal 104 by using estimated symbols at each terminal 104. Symbol estimation is carried out by either a linear joint detection or a non-linear joint detection with group successive interference cancellation.

Equation (3) depicts linear joint detection, where $A_{21}$ is the joint detection matrix, which is used to detect symbols of all channels. Alternatively, joint detection matrix of low dimension may be estimated and used to detect symbols of a subset of all channels. Once the symbols of subset of the channels are detected, these are subtracted from the received traffic signal. The next subset of channels is then detected by using the received traffic signal and subtracting the interference contributed from previously detected channels. The process is iterated until all channels are detected. This process is called detection with group successive interference cancellation.

At step 404, the rate limit of the channels is computed at each receiving end. In an embodiment, the computation of the rate limit of the channels is based on the channel characteristics, the total signal quality, and the noise characteristics. In an embodiment, the rate limit is a combination of the number of code channels and the modulation scheme, as described earlier in conjunction with the description of FIG. 3. In various embodiments of the present invention, the rate limit is a different combination of the number of code channels, and the modulation scheme is used for transmission and reception of data. The computation of the rate limit is described in detail, in conjunction with FIG. 5.

At step 406, rate assignment of the channels is computed at base station 102. The computation of the rate assignment of the channels is based on control information containing at least the rate limit. The control information is the information that is communicated to the transmitting and receiving ends to control the flow of data, i.e., transmission and reception, in the communication system. The rate assignment is determined by a combination of the number of code channels, and the modulation scheme and/or the channel-coding scheme, so that an effective data rate is not greater than the rate limit for communication between the terminals and the base stations. Effectively, rate assignment is the data transmission rate to be assigned to transmitting ends in the communication system, to enable robust data reception, without interfering with other transmissions in the communication system.

At step 408, computed rate assignments are assigned to the channels to mitigate interference in the communication system. The control information containing a downlink rate limit is sent from terminal 104 to base station 102 through an uplink control channel.

Figure 5:
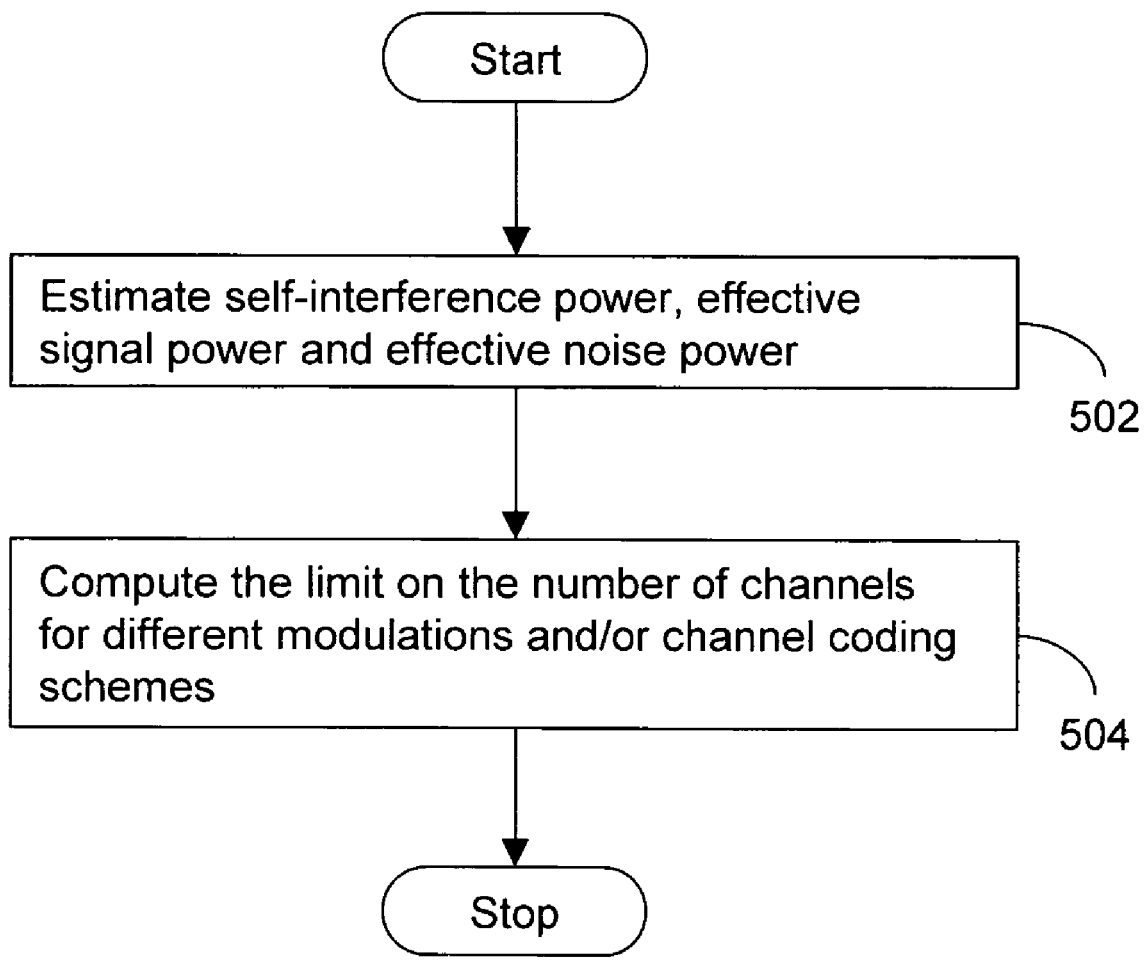
FIG. 5 is a flowchart illustrating a method for computing the rate limit, in accordance with an exemplary embodiment of the present invention.

FIG. 5 is a flowchart illustrating the method steps to be performed for computing the rate limit, in accordance with an exemplary embodiment of the present invention. At step 502, self-interference power is estimated by using the following equation:

$$P_{SI}=P_S\cdot(1/\text{SINR}-1/\text{SNR}) \qquad (4)$$

where $P_{SI}$ is the self-interference power, and $P_S$ is the signal power. $P_S$ may be obtained from the estimated channel impulse response. Signal-to-inter-cell-interference-plus-thermal noise ratio (SINR) is computed using $P_S$ and noise power $P_n$.

At step 504, the limit on the number of channels is computed, based on self-interference power, total available transmission power, threshold for each modulation scheme, signal power, and noise power, by using the following equation:

$$NL = \frac{P_s P_m}{\text{threshold} \cdot (P_n + P_{SI} P_m)} \quad (2)$$

where NL is the channel limit, $P_S$ is the received signal power, $P_m$ is additional power available at the transmitter, $P_s P_m$ is therefore the total available received power, $P_n$ is the noise power, $P_{SI}$ is the self-interference power, and the threshold is an SINR requirement for a combination of a modulation and coding scheme.

Figure 6:
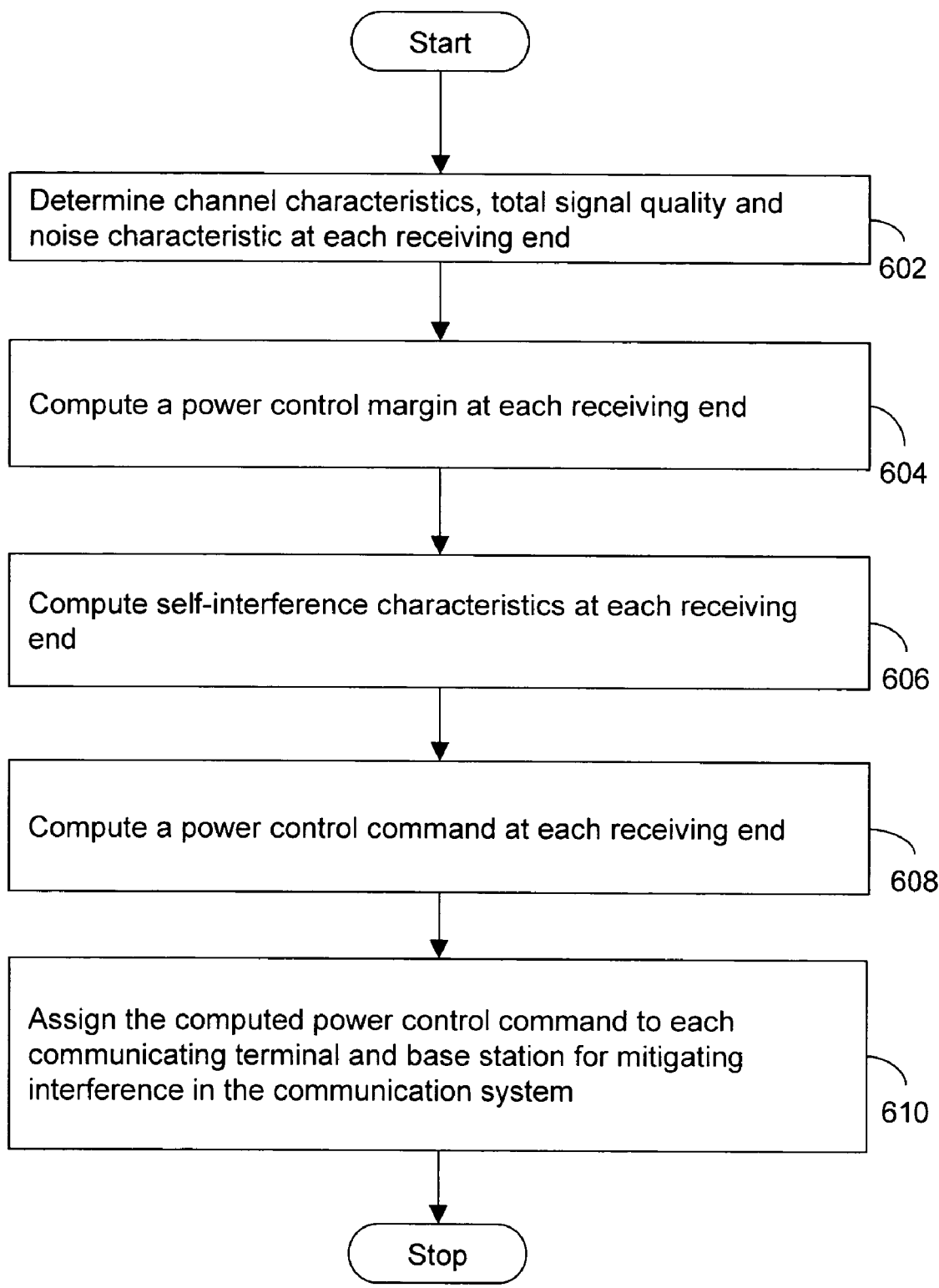
FIG. 6 is a flowchart illustrating a method for mitigating interference in a communication system, in accordance with another exemplary embodiment of the present invention.
Figure 7:
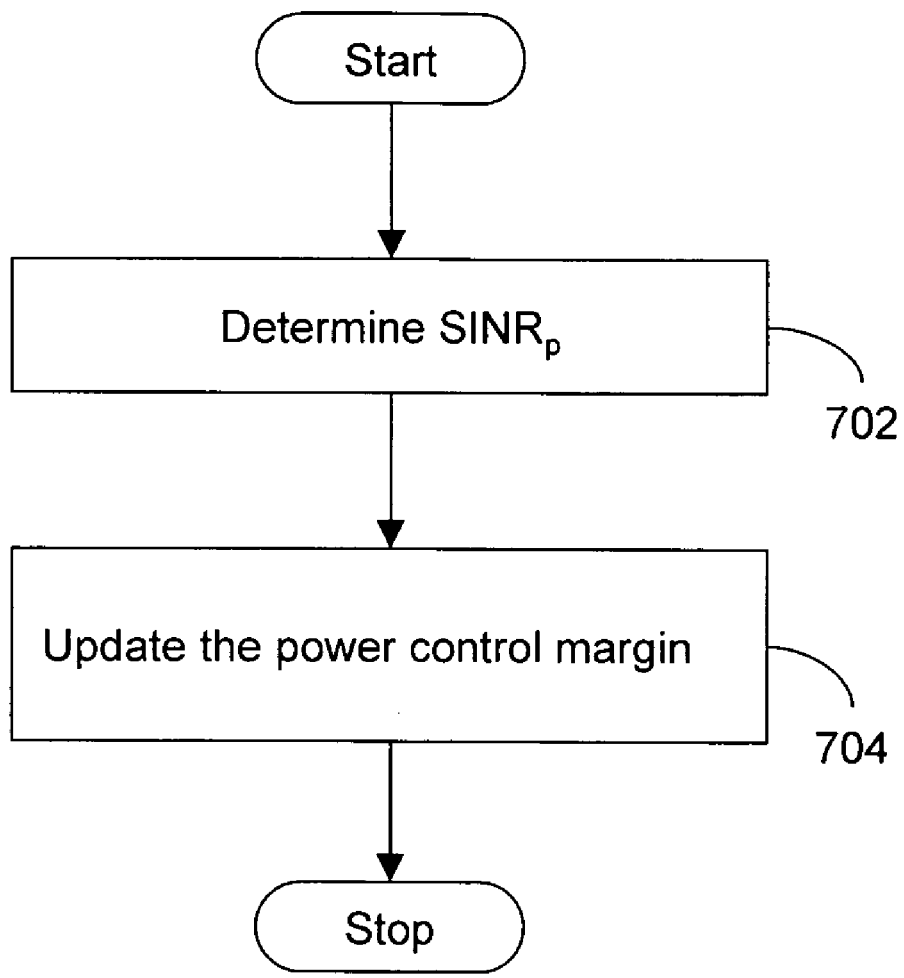
FIG. 7 is a flowchart illustrating a method for computing the power control margin, in accordance with an exemplary embodiment of the present invention.

In another embodiment of the present invention, interference is mitigated by computing the power control command, described in detail in conjunction with FIGS. 6 and 7.

FIG. 6 is a flowchart illustrating a method for mitigating interference in a communication system, in accordance with another exemplary embodiment of the present invention. At step 602, channel characteristics are determined at each receiving end. The determination of the channel characteristics is based on at least the first signal, the total signal quality, and the noise characteristics. In one embodiment of the present invention, the total signal quality is an SINR. In another embodiment of the present invention, the total signal quality is SNR.

At step 604, a power control margin is computed at each receiving end by using at least an estimated and a received signal quality characteristic of a current frame and previous frames.

A frame is a part of a data stream that is received and decoded by the receiving end. As data is transmitted between the transmitting end and the receiving end in the form of a wireless signal, it has to be received and converted to a digital format to comprehend the data that was sent. A frame is a set of data bytes in a digital format, which is usually an integral multiple of a byte.

The power control margin is the additional transmission power required to compensate for signal quality fluctuation either due to time varying channel or time varying interference. The computation of power control margin is described in detail in conjunction with FIG. 7.

At step 606, interference characteristics are computed at each receiving end by using at least the first and the second signal. In an embodiment of the present invention, the interference characteristics are computed, based only on the first signal. In another embodiment of the present invention, the interference characteristics are computed, based only on the second signal. In yet another embodiment of the present invention, the interference characteristics are computed, based on the first and second signals.

Then at step 608, a power control command is computed at each receiving end. Power control command is utilized for assigning transmission power levels at the transmitting ends that ensures reliable transmission and reception of data in the communication system. The computation of the power control command is based on the power control margin, the noise characteristics, or the interference characteristics. At step 610, the computed power control command is assigned to each communicating terminal 104 and base station 102, for mitigating interference in the communication system.

FIG. 7 is a flowchart illustrating a method for computing the power control margin, in accordance with an exemplary embodiment of the present invention. At step 702, $SINR_p$ is determined as a value from the set $\{SINR(t-i), i=0, i_1, \ldots, i_{T-1}\}$, so that the following conditions are met:

i. $\lceil pT \rceil$ values in the set are greater than $SINR_p$; and (3)

ii. $T - \lceil pT \rceil$ values are smaller than $SINR_p$, (4)

wherein the SINR values at the $t^{th}$ frame are defined as:

$SINR(t-i), i=0, i_i, \ldots, i_{T-1}$, (5)

and 'p' is the outage probability; 'T' is history length in frame; and $SINR_P$ is the SINR at outage probability 'p'.

At step 704, the power control margin is updated, based on a threshold and the $SINR_P$. In an embodiment of the present invention, the SINR is replaced by the SNR measurements for the computation of power control margin.

Power control margin is given by: $PCM(i+1) = PCM(i) * Threshold/SINR_P$, wherein i is the frame index.

In yet another embodiment of the present invention, mitigation of interference in the communication system is carried out by simultaneous computation of the power and rate assignments, described in detail in conjunction with FIG. 8.

FIG. 8 is a flowchart illustrating a method for mitigating interference in a communication system, in accordance with yet another embodiment of the present invention. At step 802, channel characteristics are determined at each receiving end. The determination of channel characteristics is based on the first signal, the total signal quality that is based on at least the second signal, and the noise characteristics. At step 804, a rate limit of the channels between base station 102 and terminal 104 is computed at each receiving end. The computation of the rate limit is based on the channel characteristics, the total signal quality, or the noise characteristics.

At step 806, a power control margin is computed at each receiving end by using the current and past values of the received total signal quality. At step 808, the interference characteristic is computed at each receiving end by using either the first or second signals. The interference characteristics can be SINR, SNR, MAI, etc as described earlier in conjunction with FIG. 3. The method for computation of these interference characteristics is known in the art.

At step 810, the power control command is computed at each receiving end; and the computation of the power control command is based on the power control margin, the noise characteristics, or the interference characteristic. At step 812, the rate assignment of the channels is computed at base station 102. The computation of the rate assignment is based on at least the rate limit. At step 814, the rate assignment and power control command are assigned to each communicating terminal, including terminal 104; and base stations including base station 102, for mitigating interference in the communication system.

FIG. 9 is a block diagram of an apparatus used for mitigating interference in a communication system. Apparatus 900 comprises a means for determining channel characteristics 902, a means for computing a rate limit of the channels 904, a means for computing a power control margin 906, a means for computing interference characteristics 908, a means for computing power control command 910, a means for computing the rate assignment of the channels 912, and a means for assigning rate assignment and power control command 914. Each of the elements of apparatus 900 can be implemented as a hardware module, software module, firmware and their combination thereof.

The determination of the channel characteristics is carried out at means for determining channel characteristics 902;

and is based on at least a first signal 916, a total signal quality 918 based on at least a second signal 922, and noise characteristics 920. First signal 916, total signal quality 918 and second signal 922 are used as input for means for determining channel characteristics 902. The method for determining the channel characteristics has been described earlier in conjunction with the description of FIG. 3 and FIG. 4.

The computation of the rate limit is then carried out at means for computing a rate limit of the channels 904. The computation of the rate limit of the channels is based on the channel characteristics, total signal quality 918, or noise characteristics 920. The computation of the rate limit has been described earlier in conjunction with FIGS. 4 and 5.

The power control margin is computed at means for computing a power control margin 906. The current and past values of received total signal quality 918 are used for computation of the power control margin, described in conjunction with FIG. 7.

Interference characteristics are computed at means for computing interference characteristics 908. Either first signal 916 or second signal 922 is used for computation of the interference characteristics. The method for determining the interference characteristics has been described earlier in conjunction with the description of FIGS. 3 and 4.

Power control command is computed at means for computing power control command 910. The computation of the power control command is based on the power control margin, noise characteristics 920, or the interference characteristics. An exemplary power control command is described later in the description section.

The computation of the rate assignment of the channels is then carried out at means for computing rate assignment of the channels 912. The computation of the rate assignment of the channels is based on the rate limit. Exemplary rate assignments are described later in the description section.

The rate assignment and power control command are assigned to the transmitting end, i.e., base station 102 or terminal 104, by means for assigning the rate assignment and the power control command 914, for mitigating interference in the communication system.

FIG. 10 is a detailed block diagram of an apparatus used for mitigating interference in a communication system, in accordance with an exemplary embodiment of the present invention. An apparatus 1000 takes as input a channel impulse response 1002, a traffic signal 1004, an inter-cell interference along with thermal noise 1006, available transmission power 1008, and a rate request 1010. Apparatus 1000 includes a signal power estimation block 1012, a symbol detection and SINR estimation block 1014, another interference power estimation block 1016, a rate limit estimation block 1018, a power control margin estimation block 1020, and a rate and power assignment block 1022. Power and rate assignment block 1022 is similar in structure and function to power and rate assignment block 306

Signal power estimation is carried out at signal power estimation block 1012. Channel impulse response 1002 is used as an input to signal power estimation block 1012 for estimating signal power. SINR estimation is carried out at symbol detection and SINR estimation block 1014, based on channel impulse response 1002, traffic signal 1004, and inter-cell interference along with thermal noise 1006. Similarly, other interference power is estimated at other interference power estimation block 1016, based on inter-cell interference along with thermal noise 1006.

The output of signal power estimation block 1012, symbol detection and SINR estimation block 1014, other interference power estimation block 1016 along with available transmission power 1008, is utilized by rate limit estimation block 1018 for estimation of the rate limit. Similarly, the outputs of signal power estimation block 1012 and other interference power estimation block 1016 are utilized by power control margin estimation block 1020 for estimation of the power control margin. The outputs of rate limit estimation block 1018 and power control margin estimation block 1020 are utilized by power and rate assignment block 1022 for assigning the rate limit and power control margin to the transmitter.

In an embodiment, each of the elements is implemented as software modules, hardware modules, and their combination thereof. In another embodiment, each of these can be implemented by using flip-flops, adders, multipliers, logic gates and their combination thereof. In an embodiment of the invention, the rate assignment operations of all the terminals are performed periodically at base station 102 for the uplink and downlink channels. Since rate assignment is generally computed in the form of bytes per second, a rate match is performed first to convert the requested rate for data transmission into the closest system-specific transmission format in terms of the number of code channels, the modulation, and the coding scheme. The matched rate is then modified by the rate limit in such a way that the modified rate request matches the data traffic demand as well as the availability of the physical channel.

In an embodiment of the invention, the rate assignment is sent periodically to terminal 104 for proper transmit and receive operations. For downlink channels, traffic monitoring is carried out at base station 102, and for uplink channels at terminal 104.

The channel characteristics are utilized to assign transmission power. A quantity related to the rate limit is the self-interference-to-noise ratio d, which can be computed as d=max(SNR/SINR−1, 0).

If the rate limit is computed and tracked, the SINR requirement may be satisfied. In an embodiment, self-interference monitoring is also incorporated into the power assignment mechanism, to reduce the generation of interference. The self-interference-to-noise ratio serves as an instantaneous indicator of the self-interference level.

In an embodiment of the present invention, the power assignment is achieved by sending power control command PInc from the receiver to the transmitter. PInc=1 instructs the transmitter to increase power by one step, PInc=−1 to decrease it by one step, and PInc=0 informs the transmitter that there is no change in power. In an embodiment of the present invention, the power assignment logic is given as follows:

For each frame,
do:
    d=max(SNR/SINR−1, 0)
    if SINR<(threshold·PCM)
       {if SNR·$P_m$>threshold·PCM·(1+$P_m$·d), PInc=1
       if SNR·$P_m$≦threshold·PCM·(1+$P_m$·d), PInc=0}
    if SINR=threshold·PCM , PInc=0
    if SINR>threshold·PCM , PInc=−1
end;

where $P_m$ is the multiplicative factor indicating the remaining power, given the current transmission power, and PCM is the power control margin. For the above operations, the interference-to-signal ratio d is computed for each frame and increments in power are discontinued when self-interference dominates the performance. When self-interference dominates, rate assignment comes into play, to reduce the interference instead of solely relying on the power assignment scheme.

The present invention mitigates interference in the communication system by utilizing a combination of rate and power control for transmission of data. The scheme for assigning power and rate for the transmission of data ensures that data communication between a particular terminal and base station do not interfere with the communication between another terminal and base station more than a certain extent. This ensures that all the communication that simultaneously takes place in the communication system may be comprehensible at the receiving ends.

The present invention assigns the data rate and transmission power for each terminal, in order to maintain a robust link for each terminal in multi-path fading channels, while using minimum transmission power. With the method disclosed in the present invention, minimum inter-cell and intra-cell interference may be generated and a higher system capacity achieved.

The various embodiments or components thereof may be implemented as a part of a computer system. The computer system may include a computer, an input device, a display unit, and an interface, for example, to access the Internet. The computer may include a microprocessor, which may be connected to a communication bus. The computer may also include a memory, which may include Random Access Memory (RAM) and Read Only Memory (ROM). The computer system may further include a storage device, which may be a hard disk drive or a removable storage drive such as a floppy disk drive, optical disk drive, and the like. The storage device can also be other similar means for loading computer programs or other instructions into the computer system.

As used herein, the term 'computer' may include any processor-based or microprocessor-based system, including systems using microcontrollers, reduced instruction set circuits (RISC), application-specific integrated circuits (ASICs), logic circuits, and any other circuit or processor capable of executing the functions described herein. The above examples are exemplary only, and are not intended to limit in any way the definition and/or meaning of the term computer.

The computer system executes a set of instructions that are stored in one or more storage elements, in order to process input data. The storage elements may also hold data or other information, as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program, which may be in various forms such as system software or application software. Further, the software may be in the form of a collection of separate programs, a program module within a larger program, or a portion of a program module. The software also may include modular programming in the form of object-oriented programming. The processing of input data by the processing machine may be in response to user commands, to results of previous processing, or in response to a request made by another processing machine.

As used herein, the terms 'software' and 'firmware' are interchangeable and include any computer program stored in memory for execution by a computer, including RAM memory, ROM memory, EPROM memory, EEPROM memory, and non-volatile RAM (NVRAM) memory. The above memory types are exemplary only, and are therefore not limiting as to the types of memory usable for storing a computer program.

While the preferred embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method for mitigating interference in a communication system comprising at least one base station and at least one terminal, a channel existing between the at least one base station and the at least one terminal, the channel comprising at least a first signal channel and a second signal channel, a first signal being communicated through the first signal channel, a second signal being communicated through the second signal channel, transmission and reception of signal in the communication system being done through the signal channels, the signal received through the channels comprising the first signal, the second signal and noise, the method comprising the steps of:
   a. determining channel characteristics at one receiving end, the determination of the channel characteristics being based on at least the first signal, total signal quality being based on at least the second signal, and noise characteristics, wherein the receiving end being at least one of a terminal and base station;
   b. computing a rate limit of the channels at the receiving end, the computation of the rate limit of the channels being based on at least the channel characteristics, the total signal quality, and the noise characteristics;
   c. computing a rate assignment of the channels at the base station, the computation of the rate assignment of the channels being based on control information containing at least the rate limit; and
   d. assigning the computed rate assignment to the channels for mitigating interference in the communication system,
   wherein the total signal quality is a Signal-to-all interference-plus-thermal-Noise Ratio (SINR),
   wherein the SINR is being computed for each of the terminals by using estimated symbols at each of the terminals, wherein symbol estimation is carried out by using one of a linear joint detection and a non-linear joint detection with group successive interference cancellation.

2. The method of claim 1, wherein the control information containing a downlink rate limit is being sent from the terminal to the base station through an uplink control channel.

3. The method of claim 1, wherein the channel characteristics comprises channel impulse responses for receive antennas of the receiving end.

4. The method of claim 1, wherein the rate limit is at least a combination of at least a number of code channels and modulation scheme.

5. The method of claim 1, wherein the rate limit is being computed as a number of code channels for a predetermined modulation scheme, the computation of a rate limit comprises the steps of:

a. estimating self-interference power using the following equation:

$$P_{si}=P_s \cdot (1/\text{SINR}-1/\text{SNR}), \quad (1)$$

wherein Psi is the self-interference power, Ps is signal power, SINR is the Signal-to-all-Interference-plus-thermal-Noise Ratio, SNR is Signal-to-inter-cell-interference-plus-thermal Noise Ratio; and b. computing the limit on a number of channels based on the self-interference power, total available transmission power, threshold for the predetermined modulation scheme, signal power, and noise power by using the following equation:

$$NL = \frac{P_x P_m}{\text{threshold}(P_n + P_{SI} P_m)} \quad (2)$$

wherein NL is a channel limit, Ps is the signal power, PsPm is the total available power, Pn is the noise power, Psi is the self-interference power, threshold is an SINR requirement for a combination of modulation and coding scheme, the rate limit is given by a triplet of the NL, the modulation scheme and the coding scheme with NL being determined by equation (2).

6. The method of claim 1, wherein the rate assignment is being determined by a combination of a number of code channels, at least one of a modulation scheme and code scheme, such that an effective data rate is not greater than the rate limit.

7. A method for mitigating interference in a communication system comprising at least one base station and at least one terminal, a channel existing between the at least one base station and the at least one terminal, the channel comprising at least a first signal channel and a second signal channel, a first signal being communicated through the first signal channel, a second signal being communicated through the second signal channel, transmission and reception of signal in the communication system being done through the signal channels, the signal received through the channels comprising the first signal, the second signal and noise, the method comprising the steps of:

a. determining channel characteristics at one receiving end, the determination of the channel characteristics being based on at least the first signal, total signal quality being based on at least the second signal, and noise characteristics, wherein the receiving end being at least one of a terminal and base station;

b. computing a rate limit of the channels at the receiving end, the computation of the rate limit of the channels being based on at least the channel characteristics, the total signal quality, and the noise characteristics;

c. computing a rate assignment of the channels at the base station, the computation of the rate assignment of the channels being based on control information containing at least the rate limit; and d. assigning the computed rate assignment to the channels for mitigating interference in the communication system, wherein the noise comprises an inter-cell interference and thermal noise, wherein the noise is being obtained by subtracting an estimated intra-cell signal from one of the first and the second signal.

8. The method of claim 7, wherein the noise is being obtained from at least one inactive slot in the channel, each inactive slot being configured by a base station in such a way that no communication involving the base station occurs in the slot while communication involving other base stations are present in the slot, each inactive slot being a continuous area in the time-frequency domain of a frame structure.

9. The method of claim 7, wherein the inter-cell interference along with the thermal noise characteristic is the power computed after one of a beam forming and nulling operation is being applied.

10. The method as claimed in claim 7, wherein the method is carried out by a computer program product.

11. A method for mitigating interference in a communication system comprising at least one base station and at least one terminal, a channel existing between the at least one base station and the at least one terminal, the channel comprising at least a first signal channel and a second signal channel, a first signal being communicated through the first signal channel, a second signal being communicated through the second signal channel, transmission and reception of signal in the communication system being done through the signal channels, the signal received through the channels comprising the first signal, the second signal and noise, the method comprising the steps of:

a. determining channel characteristics at one receiving end, the determination of channel characteristics being based on at least the first signal, total signal quality based on at least the second signal, and noise characteristics, wherein the receiving end being at least one of a terminal and base station;

b. computing a power control margin at the receiving end by using at least an estimated and a received signal quality characteristic of a current frame and previous frames;

c. computing self-interference characteristics at the receiving end by using at least the first and the second signal;

d. computing a power control command at the receiving end, the computation of power control command being based on at least the power control margin, noise characteristics, and the self-interference characteristics; and e. assigning the computed power control command to each communicating terminal and base station for mitigating interference in the communication system, wherein the computing of a power control command generates a transmission power increment value, the computation of the transmission power increment value depending on at least a combination Signal-to-inter-cell-interference-plus-thermal Noise Ratio (SNR), Signal-to-all interference-plus-thermal-Noise Ratio (SINR), power control margin (PCM), and a signal quality power threshold for a selected combination of channel coding and modulation scheme.

12. The method of claim 11, wherein the total signal quality is a Signal-to-all-Interference-plus-thermal-Noise Ratio (SINR).

13. The method of claim 11, wherein the total signal quality is a Signal-to-inter-cell-interference-plus-Noise Ratio (SNR).

14. The method of claim 12, wherein the computing a power control margin comprises the steps of:
  a. determining $SINR_p$ as a value from the set $\{SINR(t-i), i=0, i_1, \ldots, i_{T-1}\}$, such that the following conditions are met:
    i. [pT] values in the set are greater than $SINR_p$; and  (3)
    ii. T−[pT] values are smaller than $SINR_p$  (4)
  wherein the SINR values at the $t^{th}$ frame are defined as:
    $SINR(t-i), i=0, i_1, \ldots, i_{T-1}$  (5)
  'p' is outage probability, 'T' is history length in frame, $SINR_p$ is the SINR at outage probability 'p'; and
  b. updating the power control margin (PCM) based on a threshold and the $SINR_p$.

15. The method of claim 11, wherein the self-interference characteristic is the self-interference-to-noise ratio.

16. The method of claim 13, wherein the computing a power control margin comprises the steps of:
  a. determining $SNR_p$ as a value from the set $\{SNR(t-i), i=0, i_1, \ldots i_{T-1}\}$, such that the following conditions are met:
    i. [pT] values in the set are greater than $SNR_p$; and  (3)
    ii. T−[pT] values are smaller than $SNR_p$  (4)
  wherein the SNR values at the $t^{th}$ frame are defined as:
    $SNR(t-i), i=0, i_1, \ldots i_{T-1}$  (5)
  'p' is outage probability, 'T' is history length in frame, $SNR_p$ is the SNR at outage probability 'p'; and
  b. updating the power control margin (PCM) based on a threshold and the $SNR_p$.

17. The method of claim 14, wherein updating the PCM is done by the following equation:
  $PCM(k+1) = PCM(k) * Threshold / SINR_p$,
wherein k is a frame index, and Threshold is the required SINR for a current modulation and coding scheme.

18. The method as claimed in claim 11 wherein the method is carried out by a computer program product.

* * * * *